United States Patent [19]
Janusz et al.

[11] Patent Number: 5,755,542
[45] Date of Patent: *May 26, 1998

[54] SELF-DRILLING/SELF-TAPPING FASTENER

[75] Inventors: Michael Janusz, Elgin; Jeffery R. Easter, Rockford; Patrick M. Monahan, Rockton; Gregg E. Melvin, Rockford, all of Ill.

[73] Assignee: Elco Textron, Inc., Rockford, Ill.

[*] Notice: The term of this patent shall not extend beyond the expiration date of Pat. No. 5,605,423.

[21] Appl. No.: 692,773

[22] Filed: Aug. 6, 1996

[51] Int. Cl.⁶ ............................................. F16B 25/00
[52] U.S. Cl. ................ 411/387; 411/397; 411/400; 248/58; 470/17
[58] Field of Search ............................ 411/387, 386, 411/388, 389, 397, 383, 384, 400, 178; 248/52, 58; 470/8, 9, 14, 17

[56] References Cited

U.S. PATENT DOCUMENTS

| | | | |
|---|---|---|---|
| 3,204,516 | 9/1965 | Wieber | 411/387 |
| 3,738,218 | 6/1973 | Gutshall | 470/9 |
| 4,233,880 | 11/1980 | Bjorklund | 411/387 |
| 4,730,970 | 3/1988 | Hyner | 411/387 |
| 4,773,111 | 9/1988 | Hyner | 470/9 |
| 5,518,351 | 5/1996 | Peil | 411/387 |
| 5,605,423 | 2/1997 | Janusz | 411/387 |

FOREIGN PATENT DOCUMENTS

| | | | |
|---|---|---|---|
| 142911 | 6/1990 | Japan | 411/387 |
| 199313 | 8/1990 | Japan | 411/387 |

*Primary Examiner*—Flemming Saether
*Attorney, Agent, or Firm*—Leydig, Voit & Mayer, Ltd.

[57] ABSTRACT

A self-drilling/self-tapping fastener which is suitable for attaching a sprinkler system to a metal supporting structure has a driving head and an integral shank with a threaded portion. Process-hardening and threading of the shank harden the shank to a degree of hardness that retains sufficient ductility for resisting vibration loads. The drill tip at the end of the shank and the lead threads adjacent the drill tip are locally hardened to a relatively high degree of hardness for drilling and tapping the metal support members. A graduated transition zone separates the high-hardness zone from the lower-hardness zone, which allows for a single fastener to exhibit two distinctly different material properties in one fastener. The fastener through this dual process also exhibits two distinct load-carrying capabilities.

12 Claims, 2 Drawing Sheets

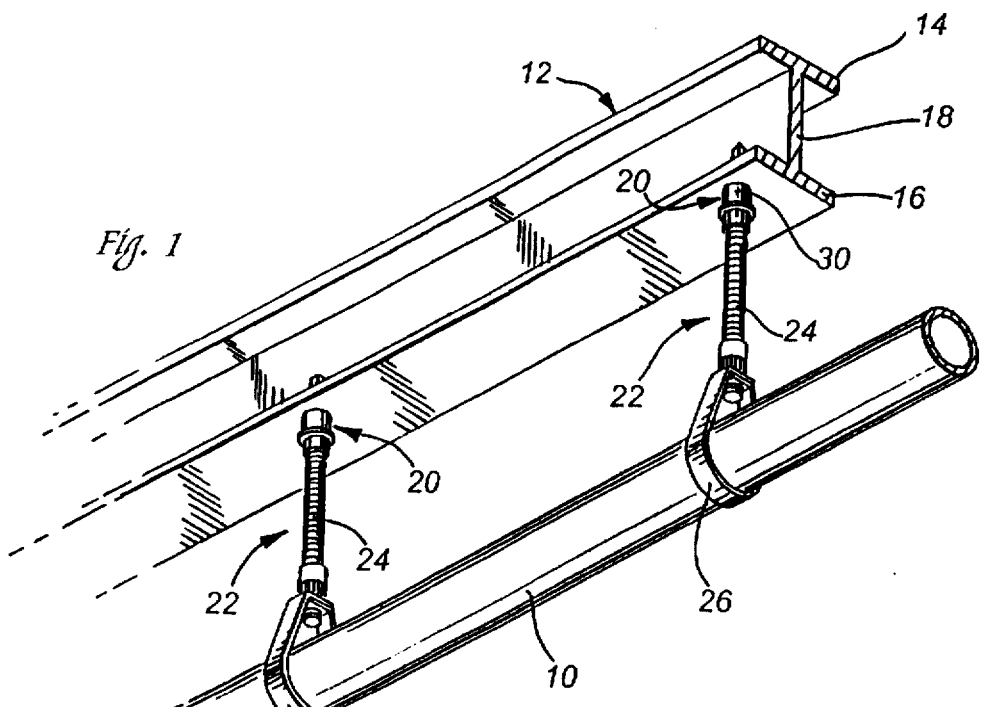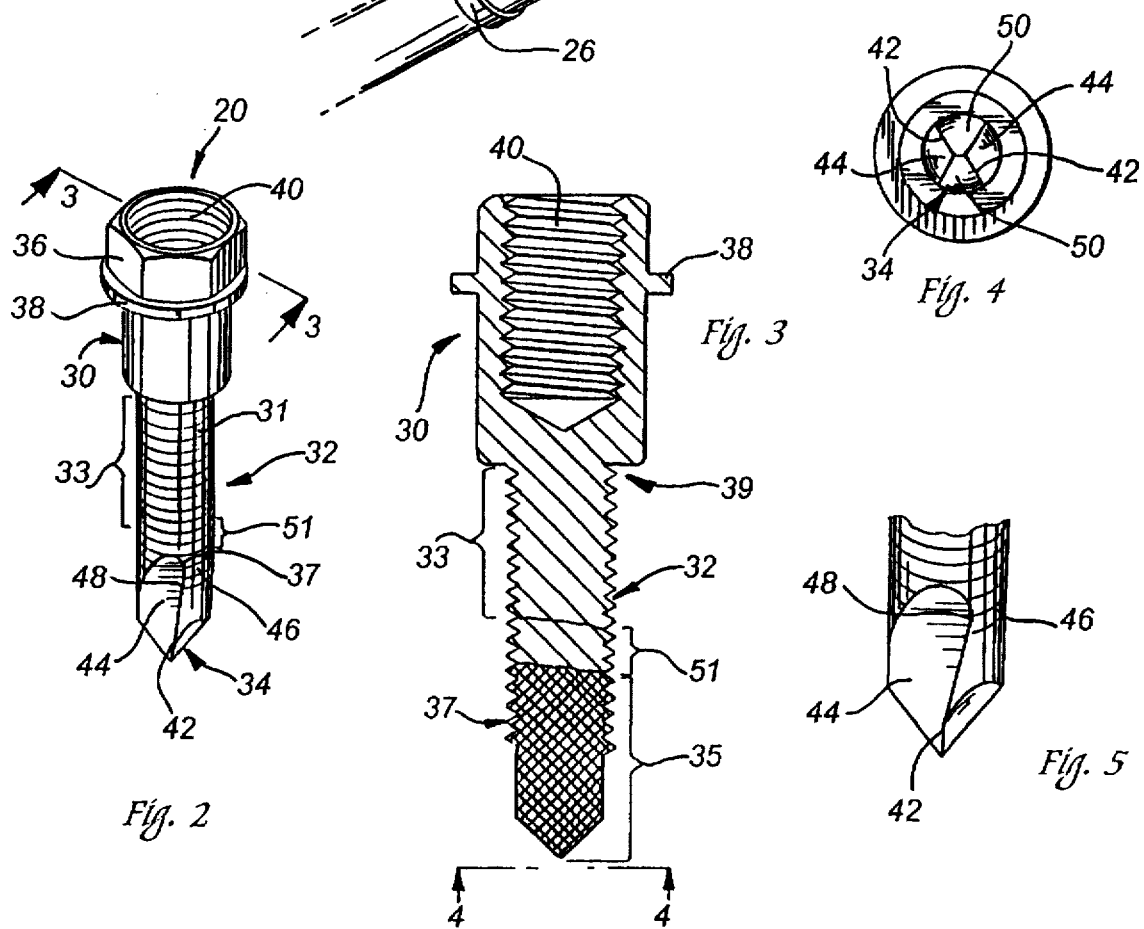

SELF-DRILLING/SELF-TAPPING FASTENER

FIELD OF THE INVENTION

This invention relates generally to fasteners for securing hanging fixtures to a steel structural member, and more particularly to self-drilling/self-tapping fasteners suitable for high reliability connection to the structural member.

BACKGROUND OF THE INVENTION

The installation of sprinkler systems, such as those used in large commercial buildings, is typically subject to rigid code standards, and those standards typically cover the fasteners for hanging a sprinkler system from the building structure. In order to be acceptable under such codes, a fastener must typically meet rigid strength, pull-out and vibration resistance tests. The current practice incorporates a number of different methods. The very basic method involves drilling a hole in the steel member large enough to accept a threaded rod, then inserting the threaded rod through the hole and double nuting the end of the threaded rod. Alternative methods are the use of powder activated stud pins with couplings. Beam clamps that attach to the top or lower flange of a steel beam can also be used. These approaches can be both time consuming, and because of the complexity of some, can also be reasonably expensive. The present invention is a substantial departure from the above-stated methods.

It has been proposed to use self-drilling/self-tapping fasteners to attach sprinkler system components to a metal supporting structure, but this has not met with success. Conceptually, self-drilling/self-tapping fasteners would be useful in this type of application, because they would dispense with the need for separately drilling holes and using nuts to secure the fastener to the support structure. The practice of installing self-drilling/self-tapping fasteners is well known, where a power tool installs the fastener in a previously undrilled member, accomplishing the drilling and tapping in a single operation during installation. Because the drilling, tapping, and fastening can all be accomplished by simply driving the fastener into the metal structural member with a power tool, the use of self-drilling fasteners can result in significant saving in time and labor.

Existing self-drilling fasteners, however, are generally not suitable for the particularly stringent application of attaching a sprinkler system to a metal supporting structure. This is because heretofore it has not been possible to produce a self-drilling fastener with a combination of characteristics necessary to drill and tap the steel structure for insertion, and to withstand the forces and loads expected to be encountered in the sprinkler system. If the tip threads of the self-drilling fastener are made hard enough to drill and tap the typical steel member which is used in a support for a building, the threads will typically lack the ductility to withstand the vibration and fatigue loads imposed during the life of the sprinkler system. If the shank of the fastener has sufficient ductility to withstand the loads over time, it is not likely that the tip and lead threads will be hard enough to drill the steel. Thus, it has been found that the requirements for a self-drilling and tapping fastener for use in a sprinkler system requires a graduated hardness pattern which has heretofore not been achievable. To applicant's knowledge, there are no existing self-drilling/self-tapping fasteners capable of meeting code related performance criteria imposed by Underwriters Laboratories or others for the application of supporting sprinkler systems.

SUMMARY OF THE INVENTION

In view of the foregoing, it is a general object of the present invention to provide a new and improved self-drilling/self-tapping internally threaded fastener that is sufficiently resistant to vibration-induced fatigue so that it can be used to anchor a sprinkler system to a metal supporting structure.

It is a more detailed object to provide a self-drilling/self-tapping internally threaded fastener for attaching a hanging fixture to a steel member that is processed such that its drill tip has a relatively high degree of hardness, while the remainder of the fastener is sufficiently ductile so that the fastener is suitable for reliably suspending a sprinkler system from a steel supporting structure.

An important object of the invention is to provide a self-drilling/self-tapping internally threaded fastener which has a drill tip with a relatively high degree of hardness and a shank which is processed to create a favorable residual stress pattern on the surface of the fastener to resist cracks from fatigue.

In accordance with these and other objects of the present invention, there is provided a self-drilling/self-tapping internally threaded fastener having an elongated shank which is process hardened (but not neutral hardened) in order to retain sufficient ductility to be fatigue resistant. The process hardening creates a favorable residual stress pattern on the surface of the fastener at its shank to resist cracks from fatigue. The fastener has a head which is shaped to allow engagement by a driving tool to rotate the fastener. The shank of the fastener is integrally formed with the head by a heading process, preferably extrusion. The shank has a threaded section with rolled threads which includes engagement threads adjacent the head and lead threads adjacent a drill tip at an end of the shank opposite the head. The rolling of the threads creates a favorable residual stress pattern on the surface to resist cracks from fatigue. The drill tip and the lead threads are locally hardened to a relatively high degree of hardness to enable the drill tip and the lead threads to drill and tap a metal structural member, whereby the fastener may be securely attached to the structural member. The hardening of the tip and lead threads is localized so that the favorable stress pattern formed in the engagement threads is substantially unaffected. Because the portion of the shank with the engagement threads is process hardened, and at a substantially lesser degree of hardness than the drill tip and the lead threads, the threads remain sufficiently ductile to be capable of resisting vibration-induced fatigue.

It is a feature of the present invention that the shank of the self-drilling fastener is process-hardened to create a favorable residual stress pattern on the surface to resist cracks from fatigue. The drill tip portion of the shank is then selectively hardened using a localized hardening process, such as induction-hardening, while maintaining the ductility and fatigue resistance of the remaining portion of the shank. The use of process-hardening of material dispenses with the need for a separate heat treat hardening process above the selective hardened portion of the fastener, and allows good control of substantially different hardness characteristics of the fastener.

It is a characteristic of the present invention that a transition zone separates the hardened tip from the ductile shank threads. The tip is relatively hard, on the order of 50 Rockwell C. The surface of the shank is, however, substantially softer, on the order of 35% to 50% of the drill tip hardness. The transition zone, which is relatively short because of the limited length of the fastener, has an intermediate and variable hardness which transitions from the relatively high hardness at the tip to the relatively softer hardness at the shank.

It has been found that the fastener has an unusual pull-out force characteristic in exhibiting a relatively high initial pull-out force, followed by a second pull-out force peak. As the force initially builds toward pull-out levels, after the relatively softer threads at the shank portion ultimately fail, the pull-out force sharply reduces, but then before the fastener is pulled completely out of the structural member, the pull-out force again sharply increases. The second peak in pull-out force is believed to result from the relatively higher hardness of the threads near the tip, and at the tip end of the transition zone. This unusual pull-out force characteristic may be useful in high shock load situations (such as due to an earthquake) where an initial shock might begin to pull the fastener out of the steel member, but before pull out is complete, the second peak in pull-out force is reached and is found to be sufficient to withstand the pull-out force, so that the hanging system, such as a sprinkler system, may remain hanging, although loose, rather than simply collapsing.

Other objects and advantages will become apparent with reference to the following detailed description when taken in conjunction with the drawings, in which:

BRIEF DESCRIPTION OF THE DRAWINGS

FIG. 1 is a fragmentary perspective view showing a sprinkler pipe attached to a steel structural member utilizing new and improved self-drilling/self-tapping internally threaded fasteners embodying the present invention;

FIG. 2 is a perspective view of one of the self-drilling/self-tapping internally threaded fasteners shown in FIG. 1;

FIG. 3 is a cross-sectional view taken axially through the fastener of FIG. 2;

FIG. 4 is an enlarged bottom view of the fastener as seen along the line 4—4 in FIG. 2;

FIG. 5 is an enlarged fragmentary perspective view of the drill tip portion of the self-drilling fastener shown in FIG. 2.

Figure 6:
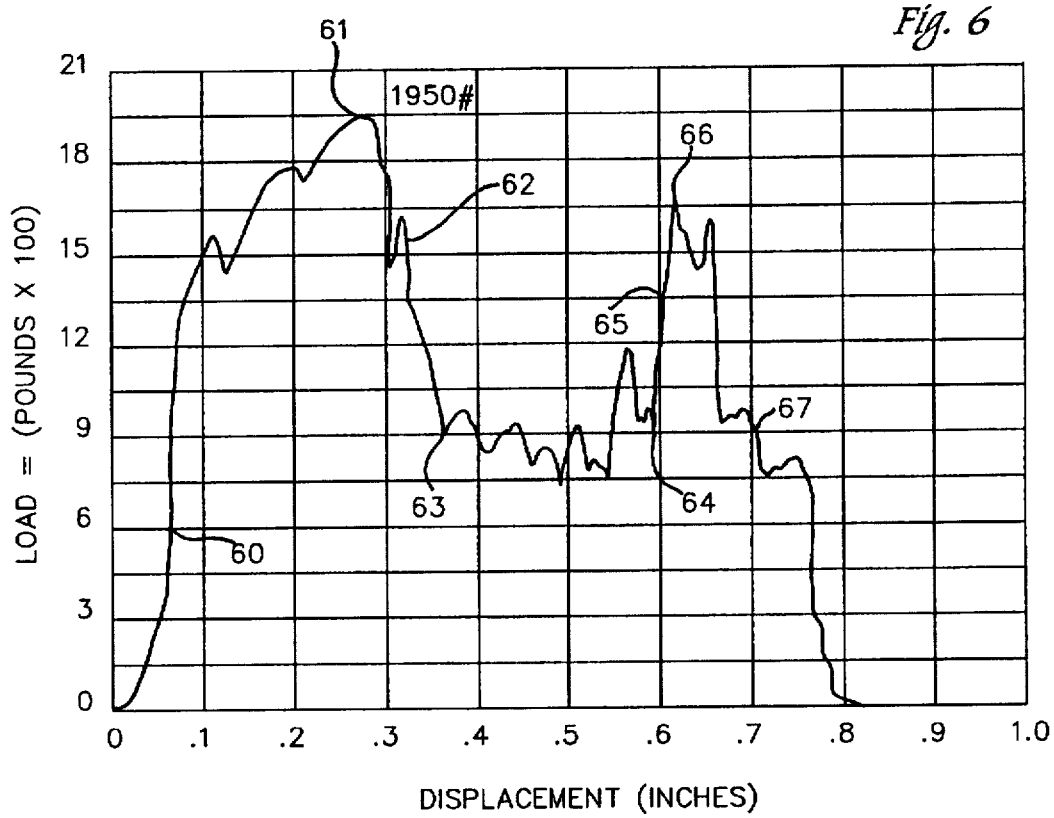
FIGS. 6 and 7 are graphical illustrations of the unique pull-out force characteristic achieved by a fastener according to the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 shows, for illustration purposes, a pipe 10 which is part of a sprinkler system. The pipe 10 is anchored to a steel support structure using self-drilling/self-tapping internally threaded fasteners 20 embodying the present invention. As illustrated, the steel support structure includes a steel beam 12 which comprises vertically spaced upper and lower elongated horizontal flange members 14, 16 joined by a central vertical web 18. The self-drilling fasteners 20 are drilled and threaded into the lower member 16 of the steel beam 12. The sprinkler pipe 10 is attached to the fasteners 20 by means of hanging fixtures 22. In the present embodiment, each hanging fixture 22 includes a threaded rod 24 and a swivel ring 26 attached to one end of the rod. The sprinkler pipe 10 is received in the swivel ring 26. The other end of the threaded rod 24 is securely attached to the fastener, thereby supporting the sprinkler pipe 10 on the underside of the steel beam 12.

Turning now to FIG. 2, the self-drilling/self-tapping internally threaded fastener 20 has a head 30 and an elongated shank 32 integrally formed with the head. The end of the shank 32 opposite the head is formed into a fluted drill tip 34 which allows the fastener 20 to drill into a steel structural member. The portion of the shank 32 between the drill tip 32 and the head 30 is a threaded portion 31 which includes engagement threads 33 adjacent the head 30 and lead threads 37 immediately adjacent the drill tip 34. The lead threads 37 include several tapping threads 46 and several helical threads adjacent the tapping threads.

The head 30 is shaped for engaging a driving tool which is capable of rotating the fastener 20 to drive the drill tip 34 and the threaded portion 31 of the shank 32 through a steel structural member, such as the steel beam 12 shown in FIG. 1. The head 30 can be formed to have any of the many well known rotational driving means. In the present embodiment, the end portion of the head 30 is formed into a hex-shaped driving end 36. An annular flange 38 on the head 30 abutting the driving end 36 serves as a stop for the hex-shaped socket used to engage the driving end to drive the fastener. The head 30 further includes a connecting means to allow secure attachment of a hanging fixture to the fastener. As can be best seen in the cross sectional view in FIG. 3, in the present embodiment the head 30 has a coaxial thread form 40 therein, which is threaded and sized for receiving a threaded connector such as the threaded rod 24 in FIG. 1. The head 30 terminates in a shoulder 39 which is adapted to bear against the support structure into which the fastener is drilled and tapped.

The drill tip 34 is defined by metal cutting edges 42 and flutes 44. The flutes 44 extend upwardly from the end of the shank 32 and into the first few threads in the threaded portion 31 immediately adjacent the drill tip 34. Those threads which are interrupted by the flutes form the tapping threads 46. In the present embodiment, two flutes 44 are formed in the drill tip 34. As can be best seen in FIG. 4, two beveled faces 50 are machined on the end of the drill tip 34 at an angle projecting upwardly and outwardly from the center axis of the shank 32. The two beveled faces 50 are diametrically spaced around the end of the tip. The two flutes 44 are also diametrically spaced and begin approximately 90 degrees rotated from the beveled faces. The cutting edges 42 of the drill tip 34 are defined by the sharp edges created at the intersection of the flutes 44 and the beveled faces 50.

The self-drilling fastener 20 of the present invention is especially suitable for attaching a sprinkler system to a metal supporting structure which includes support members such as, but not limited to, the steel beam 12 shown in FIG. 1. In accordance with the present invention, the self-drilling fastener 20 is processed to have a dual-hardness level. The lower portion of the shank 32, which is shown as the cross-hatched portion 35 in FIG. 3 and includes the drill tip 34 and the lead threads 37, has a relatively high degree of hardness to enable it to drill and tap the steel member. The portion of the shank 32 with the engagement threads 33, on the other hand, has a relatively lower degree of hardness so that it remains sufficiently ductile and capable of resisting fatigue induced by vibrational loads. The degree of hardness of the upper portion of the shank with the engagement threads 33 is still sufficiently high, however, so that it can withstand the torque experienced when the fastener is being driven into a steel member and is capable of reliably supporting the sprinkler system when attached thereto. A graduated transition zone 51 separates the high hardness portion 35, 37 from the lower hardness shank 33; the combination provides for a single fastener which exhibits two distinctly different material properties in a single fastener, and two distinct load-carrying capacities.

It is a feature of the present invention to make the upper portion 33 of the shank 32 sufficiently hard yet ductile enough to be fatigue resistant by utilizing the processes which form the shank 32 to "process-harden" it. Process-hardening the shank 32 avoids the need to employ a heat treat-hardening process, which tends to be not very selective, and which will likely cause unwanted overall hardening. After the shank 32 is formed and process-hardened, a localized hardening process is used to harden the drill tip 34 and the lead threads 37 to a relatively high degree of hardness sufficient to drill and tap a steel structural member. This hardening process is sufficiently localized, and the transition zone 51 provides a sufficient buffer, such that the hardness of the portion of the shank with the engagement threads 33 is not substantially affected. In the preferred practice of the invention, the localized hardening process which is utilized is induction hardening. However, it may also be possible to use other available localized hardening techniques, according to the teachings of the invention, to achieve a fastener as taught herein.

More specifically, to form the self-drilling fastener, metal wire is formed by means of a heading process, to shape the head portion and an integral shank portion extending from the head portion. The preferred heading process is extrusion, and extrusion is preferred because it is a process-hardening technique which serves to establish a base hardness level of the shank portion. The heading process includes formation of a driving means, such as the hex-shaped driving end 36. If the head of the fastener is to have a threaded socket for attachment of a hanging fixture, as in the preferred embodiment, the socket can be formed in the heading process which formed the head and shank portions, and then tapped to form the threads therein.

The heading process which forms the shank portion also hardens the shank portion. After the shank portion is formed, threads are rolled on the shank portion. Rolling the threads further creates a favorable residual stress pattern on the surface to resist cracks from fatigue. The formation of the shank and the threads hardens the engagement threads to a pre-established hardness level such that the portion of the shank with the engagement threads remains relatively ductile. By way of example, the shank portion after the heading operation has a hardness of about 35%–50% of the drill tip hardness. Rolling the threads increases the hardness of the shank portion by about an additional 2%–4%. After the drill tip 34 is formed by forming the beveled end faces and flutes, the lower portion 35 (FIG. 3) of the shank is hardened to a relatively high level of hardness, preferably greater than 50 Rockwell C, preferably utilizing a localized hardening process, such as induction-hardening.

As a result of process-hardening, the threads of the upper portion of the shank 32 are generally softer than would be achieved in a normal case hardened piece. When the fastener 20 is driven into a metal support member, the relative softness of the threads allows the threads to conform with the tapped threads in the support member, thereby providing enhanced contact between the threads and the support member.

As a further feature of the present invention, the torque required for the tapping threads 46 to tap a hole drilled by the drill tip 34 is reduced by forming the flutes 44 at the drill tip at an angle with respect to the longitudinal axis of the shank 32. As can be best seen in the enlarged view of the drill tip in FIG. 5, the flutes 44 cut through the tapping threads 46, and the intersection of the flutes with the tapping threads creates cutting edges 48 of the tapping threads. When the self-drilling fastener 20 is rotated by a tool with the drill tip 34 engaging a structural member, the tip will begin to drill a hole in the structural member. After sufficient penetration of the drill tip 34 into the structural member, the tapping threads 46 will engage the drilled hole and begin to tap threads in the hole. By forming the flutes 44 at an angle with respect to the axis of the shank 32, the cutting edges 48 of the tapping threads are offset from one another in the circumferential direction of the shank. As a result, when the tapping threads 46 start to tap the drilled hole, their cutting edges 48 cut into the wall of the hole sequentially rather than simultaneously. As a result, the torque needed to tap the threads is significantly reduced. In the present embodiment, the flutes 44 form an angle of about 8–15 degrees with the axis of the shank 32. It is estimated that a reduction of tapping torque of about 50% is achieved with such a configuration as compared to the configuration in which the cutting edges of the tapping threads are aligned in the longitudinal direction of the shank.

The reduction in tapping torque is particularly significant in the present invention because the fastener has a hardened tip which is capable of drilling structural steel. Forming the tapping threads such that they engage sequentially rather than simultaneously provides a structure where the tapping torque is distributed among the tapping threads. Even though the tapping threads are at an increased hardness level, this reduction in torque provides further assurance that the fastener will form the threads during the drilling and tapping operation.

In processing a fastener according to the preferred practice of the present invention, it is necessary to adjust the induction hardening conditions for the tip so that the transition zone provides an adequate buffer between the tip and the less-hardened engagement threads. Thus, it will be necessary to harden the tip in such a way that does not transfer sufficient heat through the transition zone to provide unwanted hardening of the engagement threads. Since the material of the fastener, its diameter and dimensions will all affect the conditions, it will now be within the skill of those working in this art to select induction-hardening conditions, times, temperatures and currents, to achieve the hardening of the tip without substantial hardening of the engagement threads of the shank, and to maintain within a relatively limited transition zone the graduated hardness between the two distinct levels at the tip and shank.

This will be better appreciated with reference to FIG. 3 which shows the engagement threads 33 at the upper portion of the shank, the hardened tip (along with the tapping threads) at the relatively harder section 35, and intermediate transition zone 51. The transition zone separates the high hardness region 35, from the lower hardness shank 33, to allow for two distinctly different material properties in a single fastener. In the preferred practice of the invention, the hardness of the tip zone 35, is on the order of 50 Rockwell C, whereas the hardness of the shank 33 is on the order of 35%–50% less. That very substantial difference in hardness is accounted for by a hardness transition across the zone 51 which, at its tip end, is at substantially the same hardness level as the tip 35, i.e. about 50 Rockwell C, and provides a transition in hardness of up to 25 Rockwell C across the relatively short zone.

The process hardening of the engagement threads, and the avoidance of disturbing that process-hardening during the localized hardening process of the tip, provides a significant structural feature to the present invention. By means of the process-hardening of the threads, a favorable residual stress pattern is created in the portion of the shank which includes the engagement threads. The material at the surface of the shank, and which forms the engagement threads, is put into a stress condition. If the fastener is to fail, the failure mechanism must overcome the internal stress in order to initiate a crack. Thus, the creation of this favorable residual stress pattern tends to prevent the initiation and formation of cracks in the shank of the fasteners.

We have found that it is the rolling of the threads which creates this favorable residual stress pattern. The shank is first brought to a desirable hardness level by the heading process, preferably extrusion, which is a form of process-hardening which creates a given hardness level. Roll forming the threads at that point then creates this residual stress pattern which we have found to be important in avoiding vibration-induced failures. In having created that favorable residual stress pattern, however, it is important to see that it is not destroyed during the course of hardening the tip. For that reason, it is important to control the localized process for hardening the tip to assure that it is localized, and that the transition zone adequately isolates the tip which is being hardened from the shank which has the favorable residual stress pattern, so as to protect the latter. When the process is performed as described herein, those conditions are met, and a fastener having the dual-hardness properties is produced.

It has been found that a fastener so-formed not only is capable of drilling and tapping a steel structure, and resisting vibration induced loads, but in addition has two distinct load-carrying capacities. Pull-out tests of fasteners have confirmed this. In such a pull-out test, the fastener is first secured in a structural member, as illustrated, for example, in FIG. 20. A load is then applied to the fastener until it begins to fail and begins to pull out of the structural member. The load is measured as a function of fastener movement. Typically a fastener will have a high pull-out force, and once failure commences, the pull-out force will then rapidly reduce, until the fastener is removed from the structural member and the pull-out force goes to zero. A fastener constructed according to the present invention, however, exhibits an initial peak followed by a second peak in pull-out force.

Figure 7:
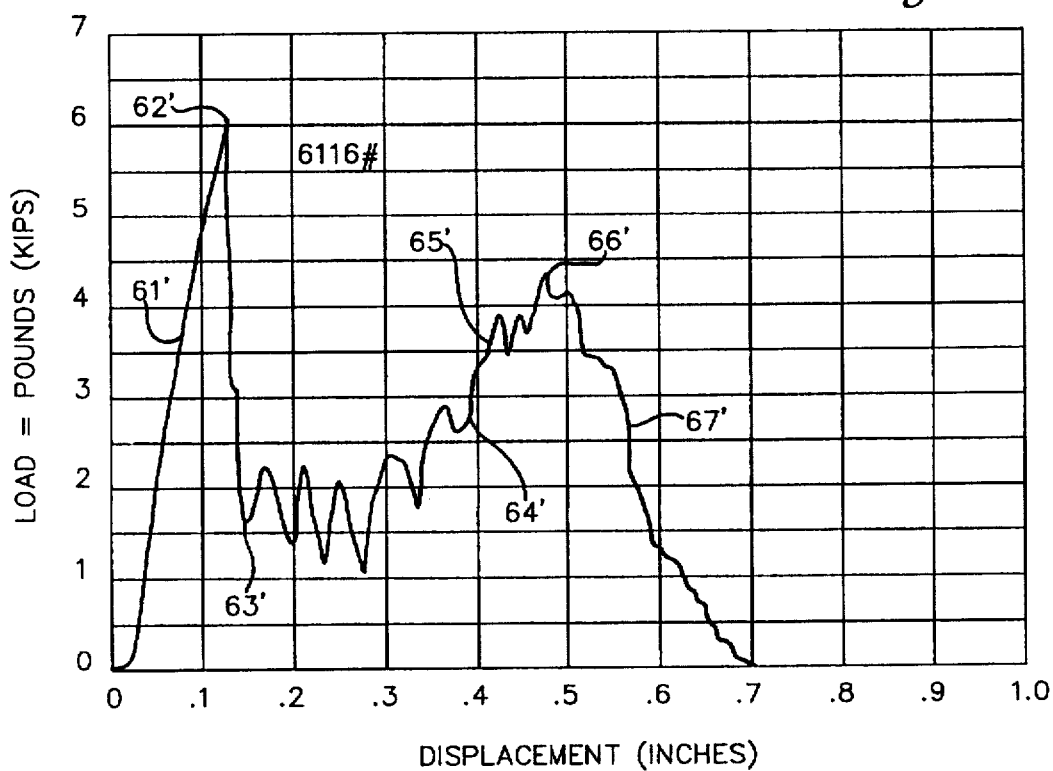

Turning to FIGS. 6 and 7, this two level pull-out characteristic will be better described. FIG. 6 represents a pull-out test of a fastener in a relatively thin steel structural member, which was 0.112 inches in thickness. FIG. 7 represents a similar test, but in thicker steel, in this case steel which was 0.250 inches in thickness.

Referring in greater detail first to FIG. 6, it will be seen that FIG. 6 shows a plot of pull-out force applied to the fasteners (plotted on the ordinate) versus displacement distance of the fastener (plotted on the abscissa). It will be seen that at the start, there is zero pull-out force and zero displacement. A sharply rising section 60 indicates a very substantial pull-out resistance at the outset, rising to a peak 61 which represents the maximum pull-out force. After the peak 61 is exceeded, the pull-out force rapidly declines in the area 62, with very little change in pull-out distance. This is believed to indicate the failure of the engagement threads after they have reached their maximum capacity to withstand pull-out.

However, rather than declining rapidly to zero, the zone 62 has a termination point 63 following which the pull-out force levels off for a substantial travel distance of the fastener. The zone extends from the point 63 to a further point 64, following which there is unexpectedly a substantial rise in pull-out force in the region 65, ultimately reaching a second peak 66. After the peak 66 is exceeded, a second declining region 67 is encountered, which represents the ever-reducing force needed to complete the removal of the fastener from the supporting structure.

We have correlated the forces and distances of the pull-out that of FIG. 6 to the fastener, and have concluded that the region between the points 63 and 64 represents the transition zone 51 (See FIG. 2). The minor peaks and valleys in the zone between the point 63 and 64 represent failure of the individual threads in the transition zone, as the transition zone is pulled through the supporting structure. However, after the threads in the transition zone fail and are pulled through the supporting structure, the pull-out force then rapidly rises in the zone 65, and this represents the interaction of the hardened threads near the tip, and at the tip end of the transition zone, with the structural steel member. It then becomes much more difficult to pull these threads through the steel member, and that causes a second peak in the pull-out characteristic. After the hardened threads are pulled through the structural member, by the necessary application of increased force, the fastener is then removed as indicated in the zone 67.

Turning briefly to FIG. 7, it will be seen that similar regions (indicated by the same reference numerals primed) are provided. It will also be seen that the region between the points 63' and 64' is somewhat more widely spaced than the points 63 and 64 of FIG. 6, due to the fact that the structural member into which the fastener is threaded is thicker in the case of FIG. 7. The force scales on the two diagrams are not the same, and in one test the maximum peak force required for pull-out in FIG. 6 was approximately 2,000 lbs., whereas the maximum force to reach the top peak in FIG. 7 was on the order of 6,000 lbs. However, in both cases, a second very substantial peak 66 or 66' was reached, which represents the engagement of the hardened threads at the tip and at the tip end of the transition zone, after the pull out and failure of the threads at the lower part of the transition zone.

A characteristic such as is illustrated in FIGS. 6 and 7 is particularly interesting for a sprinkler installation. A sprinkler system must, in many cases, be designed to withstand earthquake forces, but in some cases an earthquake force may have a peak which exceeds the primary pull-out force peak 61, 61'. Thus, under those conditions, the fastener may fail and begin to pull out of the structural supporting member. However, it is likely with the complex oscillation and vibrational conditions which exist in an earthquake, that by the time that the fastener begins to withdraw from the structural member, the peak force has passed, and the fastener again has a pull-out force peak available to resist complete removal of the fastener from the structural member. Thus, the fastener may only be partly removed, and may be loose in the structural member, having been pulled out by a quarter inch or so, but it will still be engaged in the structural member and will still be capable of supporting the sprinkler system. There is thus a better chance in these conditions of the sprinkler system staying in place so that should a fire develop during the earthquake, the sprinkler system will more likely be effective.

What is claimed is:

1. A self-drilling/self-tapping fastener comprising:

a head and a process-hardened shank with roll-formed threads, the threads including engagement threads proximate the head and lead threads immediately adjacent a fluted drill tip of the shank opposite the head, the hardness level of the engagement threads being produced solely by process hardening and roll forming of the shank and the threads to a predetermined relatively low hardness level, and the fluted drill tip and lead threads being locally hardened by heat treatment to a relatively higher predetermined hardness level of at least 50 Rockwell C, said relatively higher hardness level being locally controlled so that the ductility of the engagement threads is substantially unaffected, whereby the engagement threads have sufficient ductility to exhibit vibration resistance characteristics and the tip and lead threads are capable of drilling and tapping steel, the head, shank, drill tip, and lead threads being manufactured from a single material without any protective coatings, only the drill tip and lead threads being locally hardened by heat treatment;

wherein the lead threads include tapping threads immediately adjacent the drill tip, and wherein the drill tip includes at least two flutes extending into the tapping threads to form cutting edges of the tapping threads, the flutes being formed at an angle with respect to a longitudinal axis of the shank such that the cutting edges of the tapping threads are offset from one another in a circumferential direction of the shank, whereby the cutting edges of the tapping threads cuts sequentially into a hole drilled by the drill tip.

2. A self-drilling/self-tapping fastener as in claim 1, wherein the predetermined relatively low hardness level is about 35%–50% of the drill tip hardness.

3. A self-drilling/self-tapping fastener as in claim 1, wherein the head has a coaxial thread form therein of a size to fit a threaded rod, and the head is integrally formed by extrusion with the shank.

4. A self-drilling/self-tapping fastener as in claim 3, wherein the head includes a driving means for allowing engagement by a tool for rotating the fastener.

5. A self-drilling/self-tapping fastener as in claim 4, wherein the driving means includes an end of the head formed into a hex-shaped driving end and an annular flange immediately adjacent the hex-shaped driving end.

6. A sprinkler system for a building, in which the building has a steel support structure including steel beams onto which the sprinkler system is intended to hang, the sprinkler system comprising the combination of:

a plurality of self-drilling/self-tapping fasteners, each of the fasteners including a head for engaging a driver and an extruded shank having a fluted tip opposite the head for drilling a hole in the steel beams, the shank having engagement threads adjacent the head and lead threads immediately adjacent the fluted tip, and shank being process-hardened, the threads being formed to provide the engagement threads with a relatively low predetermined hardness level and a favorable residual stress pattern on the surface to resist cracks from fatigue, the fluted tip and lead threads being locally hardened by heat treatment to a substantially higher predetermined hardness level rendering the fluted tip and lead threads capable of drilling and tapping the steel beams, but without substantial effect on the residual stress pattern of the engagement threads, the head, shank, and drill tip being manufactured from a single material without any protective coatings, only the drill tip and lead threads being locally hardened by heat treatment;

said fasteners being self-drilled and tapped into the steel support structure until shoulders underlying the heads of the fasteners engage the steel support structure and the engagement threads are engaged in self-threaded holes in the steel;

a plurality of threaded rods engaged in the heads of the fasteners;

support hangers affixed to the threaded rods; and sprinkler pipes supported in the hangers, whereby the sprinkler system is installed without the need for utilizing nuts to secure said fasteners to the steel support structure.

7. A sprinkler system as in claim 6, wherein the relatively low predetermined hardness level is about 35%–50% of the drill tip hardness, and the substantially higher predetermined hardness level is at least 50 Rockwell C.

8. A self-drilling/self-tapping fastener for attaching a hanging fixture to a metal support member comprising:

a head shaped to allow engagement by a driving tool for rotating the fastener and having a coaxial thread form therein;

a process-hardened shank integrally formed with and extending from the head, the shank having a threaded section with rolled threads adjacent the head and a drill tip at an end of the shank opposite the head, the drill tip and lead turns of the threads immediately adjacent the drill tip being locally hardened by heat treatment to a predetermined relatively high hardness level to enable the drill tip and the lead turns to drill and tap said support member whereby the fastener may be secured to said member, and the remaining portion of the shank being process-hardened by the formation of the shank and the threads to a predetermined relatively lower hardness level, thereby to leave the remaining portion of the shank relatively ductile and capable of resisting vibration-induced fatigue, the drill tip and lead turns of the threads being hardened without substantially affecting the hardness of the remaining portion of the shank, the head, shank, drill tip, and lead turns being manufactured from a single material without any protective coatings, only the drill tip and lead turns being locally hardened by heat treatment; and wherein the lead turns of the threads include tapping threads immediately adjacent to the drill tip, and wherein the drill tip includes at least two flutes extending into the tapping threads and the threaded portion to form cutting edges of the tapping threads, the flutes being formed at an angle with respect to the longitudinal axis of the shank such that the cutting edges of the tapping threads are spaced in a circumferential direction of the shank, whereby the cutting edge of the tapping threads can sequentially cut into a hole drilled by the drill tip.

9. A self-drilling/self-tapping fastener as in claim 8, wherein the predetermined relatively high hardness level is at least 50 Rockwell C and the relatively lower hardness level is about 35%–50% of the drill tip hardness.

10. A self-drilling/self-tapping fastener as in claim 9, wherein a transition zone of intermediate hardness separates the relatively high hardness level at the drill tip from the relatively lower hardness level in the engagement threads.

11. A method of making a self-drilling/self-tapping fastener for self-drilling connection to a metal support member, comprising the steps of:

extruding a metal wire to form a head and a shank extending from the head;

forming a fluted drill tip at an end of the shank opposite the head;

rolling threads on the shank to form engagement threads adjacent the head and lead threads adjacent the drill tip, said steps of extruding and thread rolling creating a favorable residual stress pattern on the surface of the shank to resist cracks from fatigue; and locally hardening only the drill tip and lead threads by heat treatment to a predetermined relatively higher degree of hardness without substantially affecting the hardness of the engagement threads to enable the drill tip and the lead threads to drill and tap said metal support member, the fastener being formed from a single material without any protective coatings over the head, shank, drill tip, or threads.

12. A method as in claim 11, further including the step of forming a threaded socket in the head.

* * * * *